United States Patent
Kitamura et al.

(10) Patent No.: US 10,371,349 B2
(45) Date of Patent: Aug. 6, 2019

(54) OPTICAL DEVICE, OPTICAL SYSTEM, AND TICKET GATE

(71) Applicant: OMRON Corporation, Kyoto-shi, Kyoto (JP)

(72) Inventors: Norikazu Kitamura, Osaka (JP); Masayuki Shinohara, Nagaokakyo (JP); Yasuhiro Tanoue, Otsu (JP); Yuji Hirose, Kyotanabe (JP); Mitsuru Okuda, Kusatsu (JP); Kazuyuki Okada, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 112 days.

(21) Appl. No.: 15/538,702

(22) PCT Filed: Dec. 28, 2015

(86) PCT No.: PCT/JP2015/086571
§ 371 (c)(1),
(2) Date: Jun. 22, 2017

(87) PCT Pub. No.: WO2016/114101
PCT Pub. Date: Jul. 21, 2016

(65) Prior Publication Data
US 2018/0252387 A1 Sep. 6, 2018

(30) Foreign Application Priority Data

Jan. 13, 2015 (JP) .................................. 2015-004536
Sep. 14, 2015 (JP) .................................. 2015-180921

(51) Int. Cl.
*G02B 27/22* (2018.01)
*F21V 5/04* (2006.01)
(Continued)

(52) U.S. Cl.
CPC ................ *F21V 5/045* (2013.01); *F21S 2/00* (2013.01); *G02B 5/045* (2013.01); *G02B 27/22* (2013.01);
(Continued)

(58) Field of Classification Search
CPC ... F21S 2/00; F21V 5/045; F21V 5/04; G02B 27/22; G02B 5/045; G07B 15/00;
(Continued)

(56) References Cited

U.S. PATENT DOCUMENTS 6,144,480 A * 11/2000 Li ........................... G02B 6/124
359/254
2007/0279391 A1 12/2007 Marttila et al.
(Continued)

FOREIGN PATENT DOCUMENTS

CN 102713733 A 10/2012
CN 103969733 A 8/2014
(Continued)

OTHER PUBLICATIONS

Examiner provided machine translation of Yamazaki, JP 2002297072 A (Year: 2002).*
(Continued)

*Primary Examiner* — William R Alexander
*Assistant Examiner* — Balram T Parbadia
(74) *Attorney, Agent, or Firm* — Metrolex IP Law Group, PLLC

(57) ABSTRACT

An optical device includes one or more light sources and a light-guiding plate that guides light emitted from the light sources in a plane parallel to an emission surface that emits light. The light-guiding plate has light convergence portions that receive guided light and each have optical surfaces that cause light to be emitted from the emission surface in directions in which the light substantially converges at or
(Continued)

scatters from one convergence point. The convergence points for the light convergence portions are different from each other. An image is formed on an emission surface side by a collection of the convergence points. First light convergence portions positioned differently from each other along a light-guiding direction of the light-guiding plate cause light to be emitted from the emission surface in different directions in which the light substantially converges at or scatters from the same first convergence point among the convergence points.

11 Claims, 14 Drawing Sheets

(51) Int. Cl.
| | | |
|---|---|---|
| *F21S 2/00* | (2016.01) | |
| *G09F 13/18* | (2006.01) | |
| *G09F 13/20* | (2006.01) | |
| *G09F 19/12* | (2006.01) | |
| *G07B 15/00* | (2011.01) | |
| *G02B 5/04* | (2006.01) | |
| *H04N 13/32* | (2018.01) | |

(52) U.S. Cl.
CPC .............. *G07B 15/00* (2013.01); *G09F 13/18* (2013.01); *G09F 13/20* (2013.01); *G09F 19/12* (2013.01); *H04N 13/32* (2018.05)

(58) Field of Classification Search
CPC .......... G09F 13/18; G09F 13/20; G09F 19/12; H04N 13/32; H04N 13/30
See application file for complete search history.

(56) References Cited

U.S. PATENT DOCUMENTS

| | | | |
|---|---|---|---|
| 2012/0287037 A1 | 11/2012 | Shikii et al. | |
| 2013/0201723 A1* | 8/2013 | Gourlay | G02B 6/0036 362/613 |
| 2013/0321599 A1* | 12/2013 | Harrold | G02B 6/0011 348/55 |
| 2014/0211125 A1 | 7/2014 | Kurata | |
| 2014/0268327 A1 | 9/2014 | Dunn et al. | |
| 2016/0033705 A1* | 2/2016 | Fattal | G02B 6/0068 349/15 |

FOREIGN PATENT DOCUMENTS

| | | |
|---|---|---|
| CN | 104238125 A | 12/2014 |
| JP | 2009-540440 A | 11/2009 |
| JP | 2012-008464 A | 1/2012 |
| JP | 2012-116378 A | 6/2012 |
| JP | 2012-118378 A | 6/2012 |

OTHER PUBLICATIONS

The International Search Report of PCT/JP2015/086571 dated Apr. 5, 2016.

Omron Corp, Sekaihatsu Tomei Plate o Mochiita Kukan Toei Gijutsu o Kaihatsu, News Release-2014 Nen, Oct. 2, 2014, Retrieved from the Internet:<URL: http://www.omron.co.jp/press/2014/10/e1002.html> [retrieval date: Mar. 11, 2016], Relevance is indicated in the (translated) International Search Report dated Apr. 5, 2016.

Mainichi Shinbun, CEATEC 2014 Omron Usui Sheet 1-mai to LED de 3D Gazo Toei, Online, Oct. 7, 2014, Retrieved from the Internet: <URL:http://mainichi.jp/articles/20141007/mog/00m/010/012000c> [retrieval date: Mar. 11, 2016], Relevance is indicated in the (translated) International Search Report dated Apr. 5, 2016.

CEATEC2014 Omron Rittai Toei Gazo, YouTube, Oct. 6, 2014, Retrieved from the Internet: <URL: https://www.youtube.com/watch?v=izkYqW0osmA> [retrieval date: Mar. 11, 2016], Relevance is indicated in the (translated) International Search Report dated Apr. 5, 2016.

Mynavi News, Omron, Mageru Koto mo Kano na Tomei Plate kara 3D Gazo o Toei suru Gijutsu o Kaihatsu, Online, Oct. 3, 2014, Retrieved from the Internet: <URL:http://news.mynavi.jp/news/2014/10/03/181/> [retrieval date Mar. 11, 2016], Relevance is indicated in the (translated) International Search Report dated Apr. 5, 2016.

Itmedia News, CEATEC Japan 2014: Tomeiita to LeD 1-ko de Jitsugen sum Ukabu 3D Eizo sono Shikumi wa, Online, Oct. 7, 2014, Retrieved from the Internet: <URL:http://www.itmedia.co.jp/news/articles/1410/07/news117.html> [retrieval date Mar. 11, 2016], Relevance is indicated in the (translated) International Search Report dated Apr. 5, 2016.

RBB Today, [CEATEC 2014 vol. 13] Pop ya Annai Hyoji ga Kawaru! Omron no Kukan Toei Gijutsu, Online, Oct. 7, 2014, Retrieved from the Internet<URL:http://www.rbbtoday.com/article/2014/10/07/124175.html> [retrieval date Mar. 11, 2016], Relevance is indicated in the (translated) International Search Report dated Apr. 5, 2016.

The Chinese Office Action (CNOA) dated Nov. 2, 2018 in a counterpart Chinese Patent application.

* cited by examiner (a)

(b)

(a)

(b)

(a)

(b)

(c)

(a)

(b)

(c)

(a)

(b)

(a)

(b)

OPTICAL DEVICE, OPTICAL SYSTEM, AND TICKET GATE

TECHNICAL FIELD

The present invention relates to an optical device, an optical system, and a ticket gate.

RELATED ART

A stereoscopic display apparatus is known that includes a light-guiding plate, a light source, and a mask or a lens array that is disposed on the front surface of the light-guiding plate and uses a parallax barrier system or a lens array system (see Patent Document 1, for example).

Patent Document 1: JP 2012-008464A

SUMMARY OF THE INVENTION

Problem to be Solved by the Invention

When light emitted from a light-guiding plate has a spread in a direction in which the light-guiding plate guides light, an image that is to be recognized sometimes looks different depending on the position of the observer.

Means for Solving the Problems

In a first aspect, an optical device includes one or more light sources, and a light-guiding plate that guides light emitted from the light sources in a plane parallel to an emission surface that emits light, in which the light-guiding plate has a plurality of light convergence portions that receive light guided by the light-guiding plate and each have optical surfaces that cause light to be emitted from the emission surface in directions in which the light substantially converges at one convergence point in a space, or substantially scatters from one convergence point in the space, the convergence points for the plurality of light convergence portions are different from each other, and an image is formed in the space on an emission surface side by a collection of a plurality of the convergence points, and among the plurality of light convergence portions, a plurality of first light convergence portions are provided at positions that are different from each other along a light-guiding direction in which the light-guiding plate guides light, and cause light to be emitted from the emission surface in different directions in which the light substantially converges at the same first convergence point among the plurality of convergence points, or substantially scatters from the first convergence point.

Among the plurality of light convergence portions, a plurality of second light convergence portions may be provided at positions that are different from each other along the light-guiding direction, and cause light to be emitted from the emission surface in different directions in which the light substantially converges at the same second convergence point that is different from the first convergence point among the plurality of convergence points, or substantially scatters from the second convergence point.

An area of the optical surfaces of the plurality of first light convergence portions may be determined such that light beams that are respectively emitted from the plurality of first light convergence portions have approximately the same luminous intensity.

The optical surfaces of the plurality of first light convergence portions may be reflection surfaces that reflect light that is received by the first light convergence portions, and in order to cause light to be emitted from the emission surface in different directions in which the light substantially converges at the first convergence point or substantially scatters from the first convergence point, angles of the reflection surfaces of the plurality of first light convergence portions may be determined based on a positional relationship between positions of the plurality of first light convergence portions in a plane extending along the emission surface and the first convergence point.

A plurality of the light sources may be provided, and angles that optical axes of the plurality of light sources form with the plane parallel to the emission surface may be different from each other.

In a second aspect, an optical device includes a plurality of light sources and a light-guiding plate that guides light emitted from the plurality of light sources in a plane parallel to an emission surface that emits light, in which angles that optical axes of the plurality of light sources form with the plane parallel to the emission surface are different from each other, the light-guiding plate has a plurality of light convergence portions that receive light guided by the light-guiding plate and each have optical surfaces that cause light to be emitted from the emission surface in directions in which the light substantially converges at one convergence point in a space, or substantially scatters from one convergence point in the space, and the convergence points for the plurality of light convergence portions are different from each other, and an image is formed in the space on an emission surface side by a collection of a plurality of the convergence points.

A light-entering end surface of the light-guiding plate may have a plurality of partial surfaces that receive light from a corresponding light source among the plurality of light sources, and the plurality of partial surfaces may be each approximately orthogonal to an optical axis of the corresponding light source among the plurality of light sources.

The optical device may further include a lens portion that is provided between the light sources and a light-entering end surface of the light-guiding plate, reduces a spread of the light emitted from the light sources, and emits the light to the light-entering end surface of the light-guiding plate.

The plurality of light convergence portions may be formed along respective lines that are determined in advance in the plane parallel to the emission surface.

In a third aspect, an optical system includes the above-described optical device and a user interface unit, in which the optical device forms the image that shows a user a position of the user interface unit.

In a fourth aspect, a ticket gate includes the above-described optical system

Note that the above-described summary of the invention does not describe all of the features of the present invention. Also, the invention encompasses sub-combinations of these groups of features.

EMBODIMENTS OF THE INVENTION

Although the present invention will be described by the way of an embodiment of the invention hereinafter, the following embodiment does not limit the invention according to the claims. Also, all combinations of features described in the embodiment are not necessarily essential for the means for solving the problem of the invention.

Figure 1:
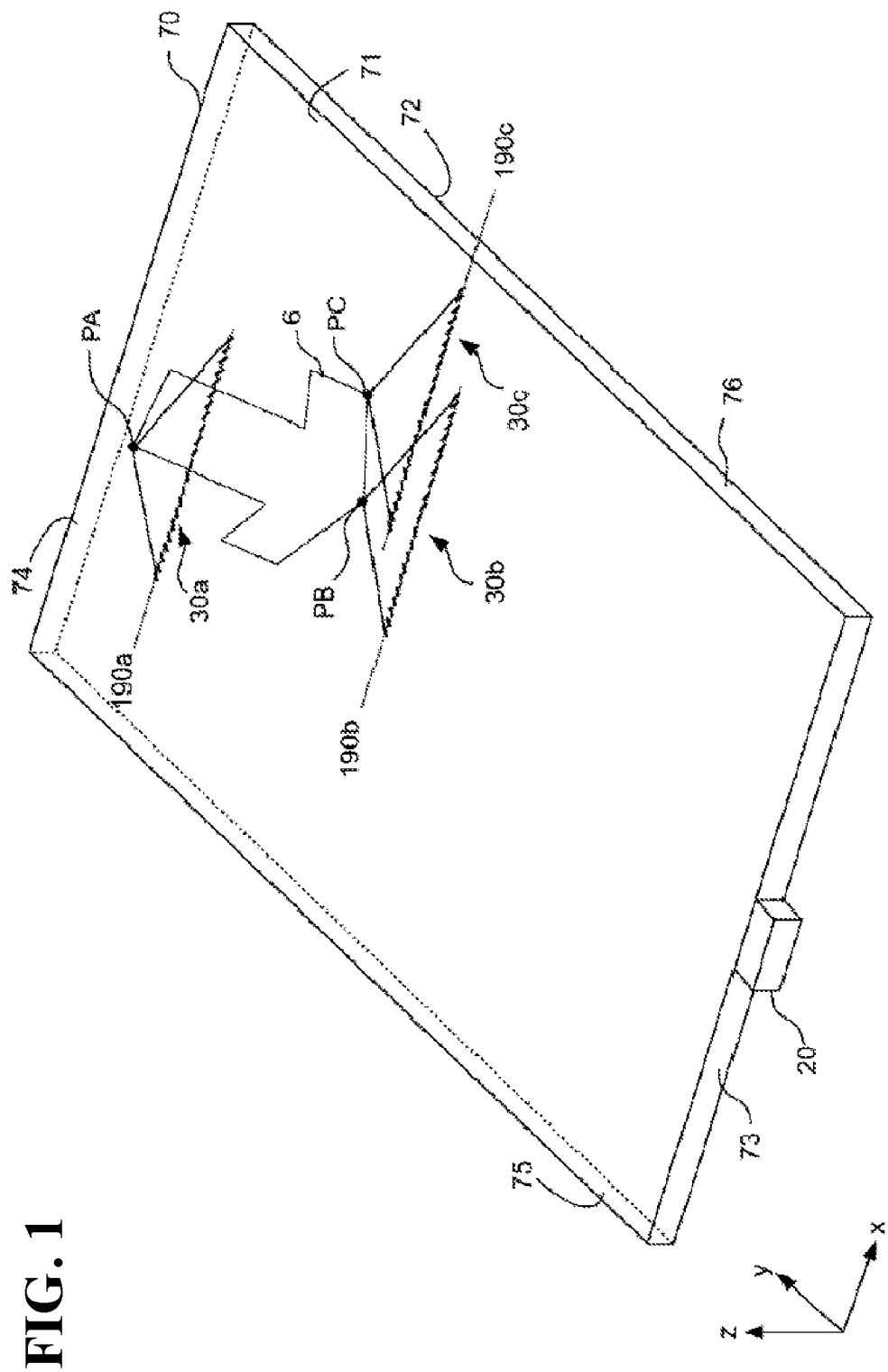
FIG. 1 schematically shows a display apparatus 10 of one embodiment together with a stereoscopic image projected to a space.

FIG. 1 schematically shows a display apparatus 10 in one embodiment together with a stereoscopic image projected in a space. Note that for the purpose of facilitating the understanding of the description, the drawings used to describe the embodiment are schematic or illustrative drawings. There are cases where the drawings used to describe the embodiment are not depicted in the actual scale. Also, for the purpose of facilitating the understanding of the position of a stereoscopic image in the space in which the stereoscopic image is recognized, the stereoscopic image that is viewed from a position that is different from the position of an observer is sometimes shown.

The display apparatus 10 has an emission surface 71 that emits light. The display apparatus 10 forms the image 6 as a stereoscopic image by light emitted from the emission surface 71. The image 6 is a stereoscopic image recognized by a user in the space. Note that the stereoscopic image refers to an image recognized to be located at a position that is different from the position of the emission surface 71 of the display apparatus 10. The stereoscopic image includes a two-dimensional image recognized at a position spaced apart from the emission surface 71 of the display apparatus 10, for example. That is, the stereoscopic image includes not only an image recognized as a stereoscopic shape but also an image having a two-dimensional shape recognized at a position that is different from the position on the display surface of the display apparatus 10.

The display apparatus 10 includes a light-guiding plate 70 and a light source portion 20. The light-guiding plate 70 is made from a transparent resin material having a relatively high refractive index. The material for forming the light-guiding plate 70 may be a polycarbonate resin (PC), a polymethyl methacrylate resin (PMMA), glass, or the like.

The light-guiding plate 70 has a back surface 72 opposite to the emission surface 71. Also, the light-guiding plate 70 has an end surface 73, an end surface 74, an end surface 75, and an end surface 76, which are the four end surfaces of the light-guiding plate 70. The end surface 73 serves as a light-entering end surface of the light-guiding plate 70. The end surface 73 is provided with the light source portion 20, and light emitted from the light source portion 20 enters the light-guiding plate 70 from the end surface 73. The end surface 74 is opposite to the end surface 73. The end surface 76 is a surface opposite to the end surface 75. The light-guiding plate 70 spreads and guides light emitted from the light source portion 20 in a planar shape in the plane parallel to the emission surface 71.

Note that in the description of the embodiment, a right-handed orthogonal coordinate system having an x axis, a y axis, and a z axis is used in some cases. The z-axis direction is defined as a direction perpendicular to the emission surface 71. The direction from the back surface 72 to the emission surface 71 is defined as the z-axis positive direction. Also, the y-axis direction is defined as a direction perpendicular to the end surface 73. The direction from the end surface 73 to the end surface 74 is defined as the y-axis positive direction. The x axis is a direction perpendicular to the end surface 75 and the end surface 76, and the direction from the end surface 75 to the end surface 76 is defined as the x-axis positive direction. Note that in order to avoid redundancy, the plane parallel to the xy flat plane is called the "xy plane", the plane parallel to the yz flat plane is called the "yz plane", and the plane parallel to the xz flat plane is called the "xz plane" in some cases.

The back surface 72 of the light-guiding plate 70 is provided with a plurality of light convergence portions 30 including a light convergence portion 30a, a light convergence portion 30b, and a light convergence portion 30c. The light convergence portions 30 are each substantially continuous in the x-axis direction. Light guided by the light-guiding plate 70 enters the positions in the x-axis direction of the light convergence portions 30. The light convergence portions 30 make light that enters the positions of the light convergence portions 30 substantially converge at fixed points corresponding to the light convergence portions 30. In particular, FIG. 1 shows the light convergence portion 30a, the light convergence portion 30b, and the light convergence portion 30c as some of the light convergence portions 30, and shows a situation in which a plurality of light rays emitted from the light convergence portion 30a, the light convergence portion 30b, and the light convergence portion 30c converge at the light convergence portion 30a, the light convergence portion 30b, and the light convergence portion 30c.

Specifically, the light convergence portion 30a corresponds to a fixed point PA on the image 6. The light rays emitted from positions in the light convergence portion 30a converge at the fixed point PA. Therefore, the wave surface of light emitted from the light convergence portion 30a is a wave surface of light that appears to be emitted from the fixed point PA. The light convergence portion 30b corresponds to a fixed point PB on the image 6. The light rays emitted from positions in the light convergence portion 30b converge at the fixed point PB. In this manner, the light rays emitted from positions in any light convergence portion 30 substantially converge at a fixed point corresponding to that light convergence portion 30. Accordingly, a wave surface of light that appears to be emitted from a corresponding fixed point can be provided by any light convergence portion 30. The fixed points corresponding to the light convergence portions 30 are different from each other, and the image 6 recognized in the space is formed by a collection of fixed points corresponding to the light convergence portions 30. In this manner, the display apparatus 10 projects a stereoscopic image to the space.

In the present embodiment, the light convergence portions 30 each include multiple reflection surfaces that are substantially continuous in the x-axis direction. The light that is reflected by the reflection surfaces of any light convergence portion 30 converges at a fixed point corresponding to that light convergence portion 30. For example, a plurality of light rays that are reflected by the plurality of reflection surfaces of the light convergence portion 30a converge at the fixed point PA. Also, a plurality of light rays that are reflected by the plurality of reflection surfaces of the light convergence portion 30b converge at the fixed point PB. Also, a plurality of light rays that are reflected by the plurality of reflection surfaces of the light convergence portion 30c converge at the fixed point PC.

Note that in the xy plane, light beams that are guided by the light-guiding plate 70 and pass through respective positions in the light-guiding plate 70 have a spread angle that is smaller than a predetermined value, and is centered on the direction that connects the positions in the light-guiding plate 70 to the light source portion 20. When the light convergence portion 30 is provided at a position spaced apart from the light source portion 20, light that is guided by the light-guiding plate 70 and enters the light convergence portion 30 has little spread approximately centered on the y-axis direction. Thus, for example, light emitted from the light convergence portion 30a substantially converges at one fixed point in the plane that includes the fixed point PA and is parallel to the xz plane. Note that in this specification, the spread of a light beam passing through a point located inside or outside of the light-guiding plate refers to the spread of light in the case where this light beam is regarded as light scattering from this point. Also, there are cases where the light beam passing through a point located inside or outside of the light-guiding plate is simply referred to as "spread of light".

As shown in FIG. 1, the light convergence portion 30a is formed along a line 190a. The light convergence portion 30b is formed along a line 190b. The light convergence portion 30c is formed along a line 190c. Here, the line 190a, the line 190b, and the line 190c are straight lines that are approximately parallel to the x axis. Each light convergence portion 30 is substantially continuous along a straight line that is approximately parallel to the x axis.

In this manner, the light convergence portions 30 are formed along predetermined lines in the plane that are parallel to the emission surface 71. Thus, light guided by the light-guiding plate 70 enters the light convergence portions 30, and the light convergence portions 30 cause the light to be emitted from the emission surface 71 in directions in which the light substantially converges at one convergence point in the space. Note that when the fixed point is located on the back surface 72 of the light-guiding plate 70, the emitted light becomes light scattered from the fixed point. Thus, when the fixed point is located on the back surface 72 of the light-guiding plate 70, the reflection surface of the light convergence portions 30 causes light to be emitted from the emission surface 71 in directions in which the light substantially scatters from one convergence point in the space. Note that as will be described later, the light convergence portions 30 may be each formed by a part of a Fresnel lens.

Figure 2:
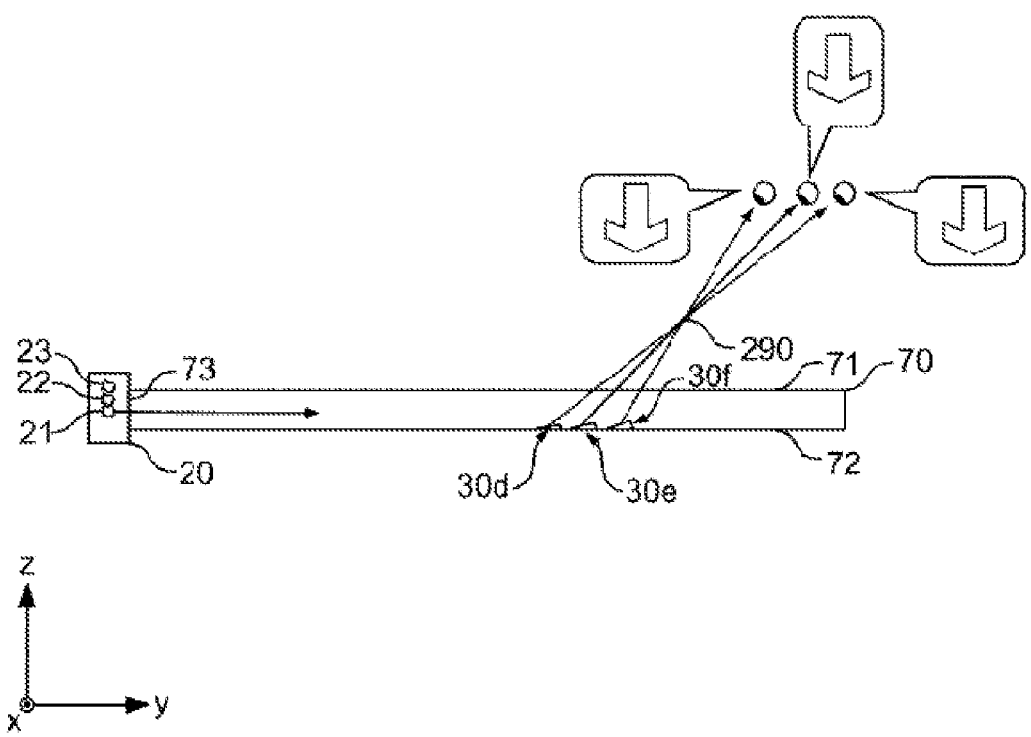
FIG. 2 schematically shows the cross-section of the display apparatus 10 in the yz plane.

FIG. 2 schematically shows the cross-section of the display apparatus 10 in the yz plane. The light source portion 20 includes a first light source 21, a second light source 22, and a third light source 23. The first light source 21, the second light source 22, and the third light source 23 emit light having a small spread angle to the end surface 73. The spread angle of light that is respectively emitted from the first light source 21, the second light source 22, and the third light source 23 and enters the light-guiding plate 70 is smaller than a predetermined value in both the xy plane and the yz plane. The first light source 21, the second light source 22, and the third light source 23 are LED light sources, for example. Specifically, the first light source 21, the second light source 22, and the third light source 23 each have a lens having a shape that reduces the spread of light in the z-axis direction. The first light source 21, the second light source 22, and the third light source 23 may reduce the spread in the z-axis direction of light that enters the light-guiding plate 70 by emitting light to the light-guiding plate 70 through these lenses. The spread in the z-axis direction of light that enters the light-guiding plate 70 is substantially collimated by these lenses, and the spread in the x-axis direction needs not to be collimated.

Angles that the optical axes of the first light source 21, the second light source 22, and the third light source 23 form with the plane that is parallel to the emission surface 71 are different from each other. Specifically, the optical axis of the first light source 21 extends along the emission surface 71. The optical axis of the first light source 21 is substantially orthogonal to the end surface 73. Accordingly, the first light source 21 emits light that is substantially parallel to the y axis to the light-guiding plate 70. On the other hand, the optical axes of the second light source 22 and the third light source 23 are inclined with respect to the emission surface 71, and are substantially not orthogonal to the end surface 73. Also, the optical axis of the second light source 22 and the optical axis of the third light source 23 are substantially not parallel to each other. In this manner, the optical axis of the first light source 21, and the optical axes of the second light source 22 and the third light source 23 are oriented in different directions. Note that angles that the optical axes of the first light source 21, the second light source 22, and the third light source 23 form with the plane that is parallel to the emission surface 71 refer to the magnitude of a sharp angle of the optical axis with respect to the plane that is parallel to the emission surface 71.

FIG. 2 shows light from the first light source 21 that is emitted from a light convergence portion 30d, a light convergence portion 30d, and a light convergence portion 30f. The light convergence portion 30d, the light convergence portion 30e, and the light convergence portion 30f are provided at different positions along the direction in which the light-guiding plate 70 guides light (for example, the y-axis direction). Here, light emitted from the light convergence portion 30d converges at a fixed point 290. Similarly, the light emitted from the light convergence portion 30e and the light emitted from the light convergence portion 30f also converge at the fixed point 290. In this manner, the light convergence portion 30d, the light convergence portion 30e, and the light convergence portion 30f cause light to be emitted from the emission surface 71 in different directions in which the light substantially converges at the same convergence point.

Note that FIG. 2 shows only the light convergence portion 30 whose emitted light converges at the fixed point 290. The display apparatus 10 has a plurality of light convergence portions 30 whose emitted light converges at the other fixed points that form the image 6. That is, the light-guiding plate 70 is provided with a plurality of other light convergence portions 30 at different positions along the light-guiding direction in which the light-guiding plate 70 guides light, the plurality of other light convergence portions 30 causing light to be emitted from the emission surface 71 in different directions in which the light converges at the same fixed point other than the fixed point 290 among the plurality of fixed points that form the image 6, or scatters from this same fixed point.

In this manner, according to the display apparatus 10, light having a small spread is used, and a plurality of light convergence portions 30 that correspond to the same convergence point are provided at different positions along the light-guiding direction. Accordingly, it is possible to form stereoscopic images that are approximately the same at positions that are different from each other in the y-axis direction. If the spread of light emitted from the first light source 21 in the yz plane is too large, light emitted from the light convergence portions 30 converges on a line extending along the y axis. Thus, when an observer looks at the stereoscopic image while moving along the y-axis direction, the image looks distorted in some cases. However, according to the display apparatus 10, approximately the same stereoscopic image can be formed using separate light at positions that are different from each other in the y-axis direction, and thus it is possible to suppress distortion of the image recognized by the observer who moves along the y-axis direction.

Figure 3:
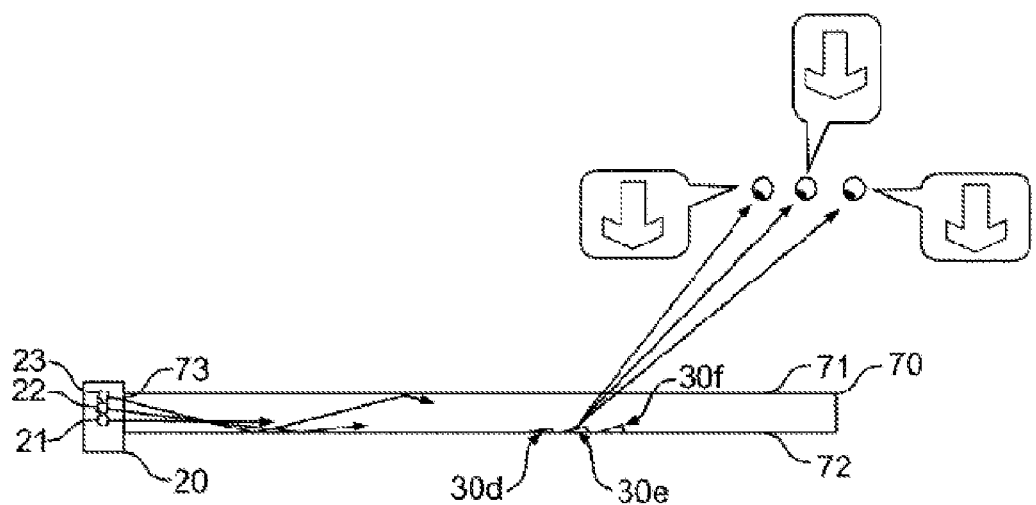
FIG. 3 schematically shows the cross-section of the display apparatus 10 in the yz plane.

FIG. 3 schematically shows the cross-section of the display apparatus 10 in the yz plane. In particular, this figure shows light emitted in the case where light emitted from the first light source 21, the second light source 22, and the third light source 23 enters the light convergence portion 30e. In the yz plane, an emission angle of emitted light obtained in the case where the light emitted from the first light source 21 enters the light convergence portion 30e, an emission angle of emitted light obtained in the case where the light emitted from the second light source 22 enters the light convergence portion 30e, and an emission angle of emitted light obtained in the case where the light emitted from the third light source 23 enters the light convergence portion 30e are different from each other. In particular, these emission angles are different from each other in the yz plane. In this manner, by using the plurality of light sources (first light source 21, second light source 22, and third light source 23) that emit light beams having different entry angles and small spreads, approximately the same stereoscopic image can be formed using separate light at positions that are different from each other in the y-axis direction.

The display apparatus 10 has three light sources whose optical axes are different from each other, namely the first light source 21, the second light source 22, and the third light source 23, and three light convergence portions 30 that cause emitted light to converge at the same fixed point, namely the light convergence portion 30d, the light convergence portion 30e, and the light convergence portion 30f. Stereoscopic images can be formed in nine directions in the yz plane by combinations of these light sources and light convergence portions. The number N of light sources having different optical axes and the number M of light convergence portions that cause emitted light to converge at the same fixed point may be any combination. For example, N may be 2, or may also be 4 or more. M may be 2, or may also be 4 or more. Also, when M is 2 or more, N may be 1. Also, when N is 2 or more, M may be 1.

Figure 4:
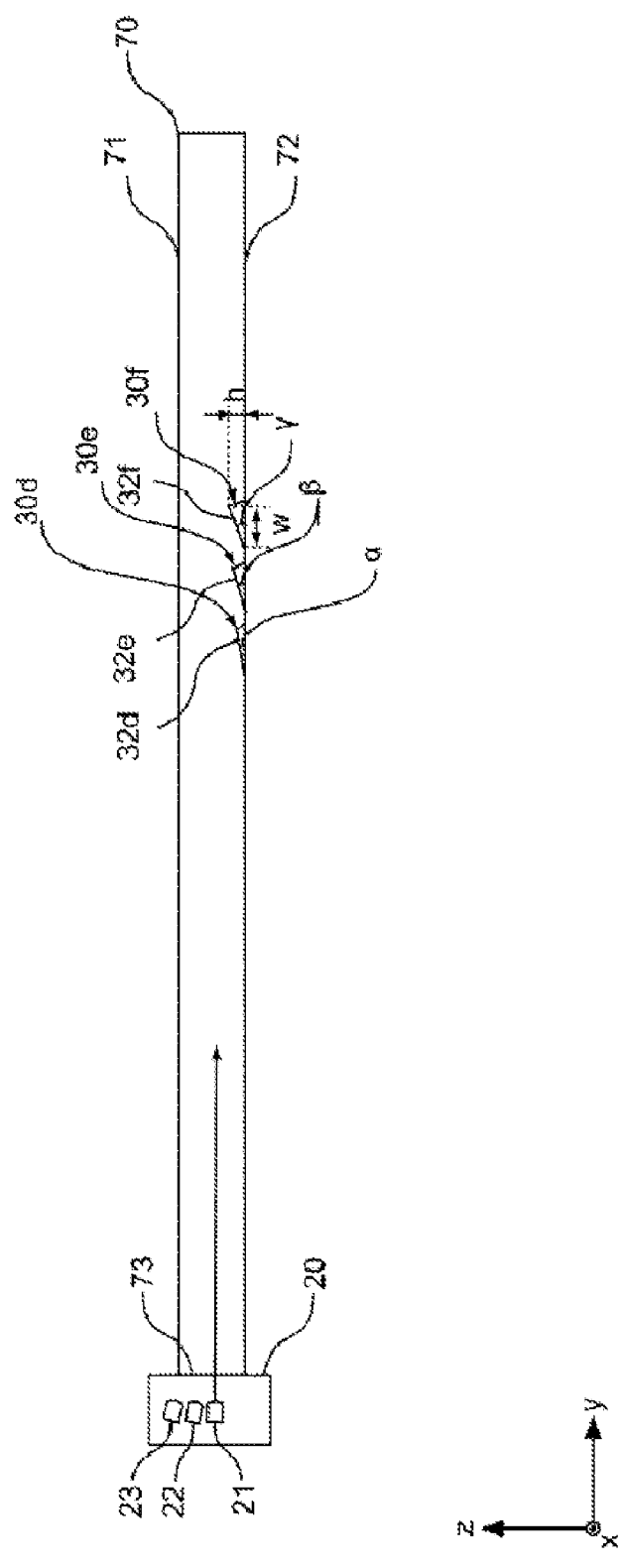
FIG. 4 is a diagram illustrating the shapes of reflection surfaces 32 of a light convergence portion 30.

FIG. 4 is a diagram illustrating the shapes of reflection surfaces 32 of the light convergence portion 30. Let an angle between a reflection surface 32d of the light convergence portion 30d and the back surface 72 be $\alpha$, an angle between a reflection surface 32e of the light convergence portion 30e and the back surface 72 be $\beta$, and an angle between a reflection surface 32f of the light convergence portion 30f and the back surface 72 be $\gamma$. The angles $\alpha$, $\beta$, and $\gamma$ are determined based on a positional relationship between the position of the light convergence portion 30d on the back surface 72 and the fixed point 290 such that light is emitted from the emission surface 71 in different directions in which the light substantially converges at the fixed point 290. In this manner, in order to cause light to be emitted from the emission surface 71 in different directions in which the light substantially converges at fixed points or scatters from the fixed points, the angles of the reflection surfaces 32 of the plurality of light convergence portions 30 are determined based on the positional relationship between the fixed point and the positions of the plurality of light convergence portions 30 in the plane extending along the emission surface 71.

Note that it is desired that the brightness of the image 6 that is recognized is approximately the same regardless of the position in the y-axis direction in which the image 6 is viewed. Thus, it is desired that the area of the reflection surface 32d, the area of the reflection surface 32e, and the area of the reflection surface 32f are determined such that light that is respectively emitted from the light convergence portions 30 has approximately the same luminous intensity. For example, a height h of each reflection surface 32 and a width w of the reflection surface 32 may be determined based on an angle between the reflection surface 32 and the back surface 72 such that light that is respectively emitted from the light convergence portions 30 have approximately the same luminous intensity. The reflection surfaces 32 of different light convergence portions 30 that cause light to converge at the same fixed point may have different heights h or widths w.

Figure 5:
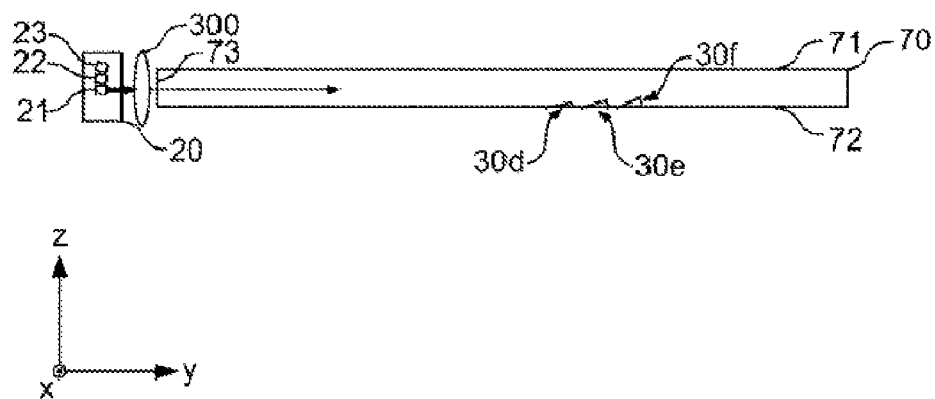
FIG. 5 schematically shows a display apparatus 310 as a modification of the display apparatus 10.

FIG. 5 schematically shows a display apparatus 310 as a modification of the display apparatus 10. The display apparatus 310 includes a lens 300 in addition to the constituent elements included in the display apparatus 10.

The lens 300 is provided in the light path between the first light source 21 and the end surface 73, in the light path between the second light source 22 and the end surface 73, and in the light path between the third light source 23 and the end surface 73. The lens 300 reduces the spread in the z-axis direction of light emitted from the first light source 21, the second light source 22, and the third light source 23, and emits the light to the end surface 73. In this manner, the lens 300 is provided between the light source portion 20 and the end surface 73 of the light-guiding plate 70, reduces the spread of light emitted from the light source portion 20, and emits the light to the end surface 73 of the light-guiding plate 70. Accordingly, it is possible to use a light source having a large scattering angle.

Figure 6:
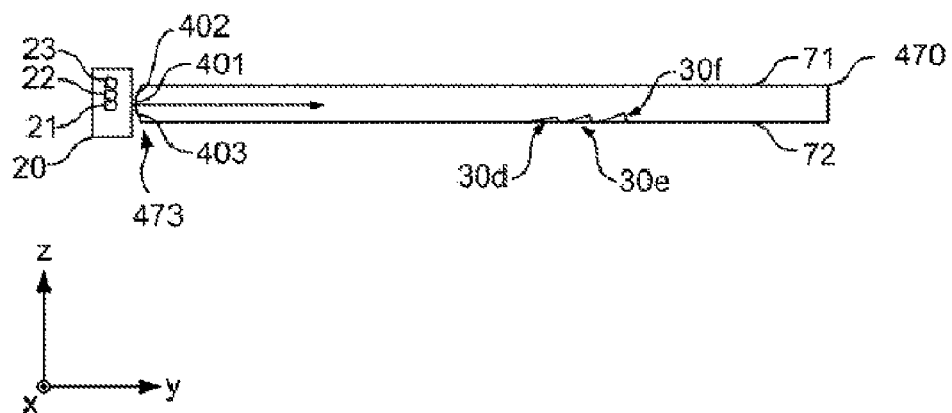
FIG. 6 schematically shows a display apparatus 410 as a modification of the display apparatus 10.

FIG. 6 schematically shows a display apparatus 410 as a modification of the display apparatus 10. The display apparatus 410 includes a light-guiding plate 470, instead of the light-guiding plate 70 included in the display apparatus 10. The light-guiding plate 470 differs from the light-guiding plate 70 in that the light-guiding plate 470 has an end surface 473 that corresponds to the end surface 73 and serves as a light-entering end surface.

The end surface 473 has a partial surface 401, a partial surface 402, and a partial surface 403. The partial surface 401, the partial surface 402, and the partial surface 403 are provided so as to respectively correspond to the first light source 21, the second light source 22, and the third light source 23. The partial surface 401 is approximately orthogonal to the optical axis of the first light source 21. Also, the partial surface 402 is approximately orthogonal to the optical axis of the second light source 22. The partial surface 403 is approximately orthogonal to the optical axis of the third light source 23. In this manner, the end surface 473 of the light-guiding plate 470 has a plurality of partial surfaces that receive light emitted from the corresponding light sources, and the partial surfaces are respectively approximately orthogonal to the optical axes of the corresponding light sources. Accordingly, it is possible to suppress a decrease in the amount of light that enters the light-guiding plate 470.

With reference to FIGS. 1 to 6, a mode was described in which the plurality of light convergence portions that each emit light in directions in which the light travels to substantially the same fixed point are provided at positions that are different from each other along the light-guiding direction in which the light-guiding plate 70 guides light. On the other hand, as is clear from FIG. 3, use of the plurality of light sources whose optical axes have different angles with respect to the emission surface 71 makes it possible to cause light that travels in different directions in the yz plane to be emitted from one light convergence portion 30e. In view of this, a configuration in which the light convergence portion 30d and the light convergence portion 30f are not included, for example, may be adopted as a modification of the above-described display apparatus. That is, a configuration with which light that travels in directions in which the light travels to substantially the same fixed point is provided by one light convergence portion without providing a plurality of light convergence portions that emit light in directions in which the light travels to substantially the same fixed point, may be adopted as a modification of the above-described display apparatus.

Figure 7:
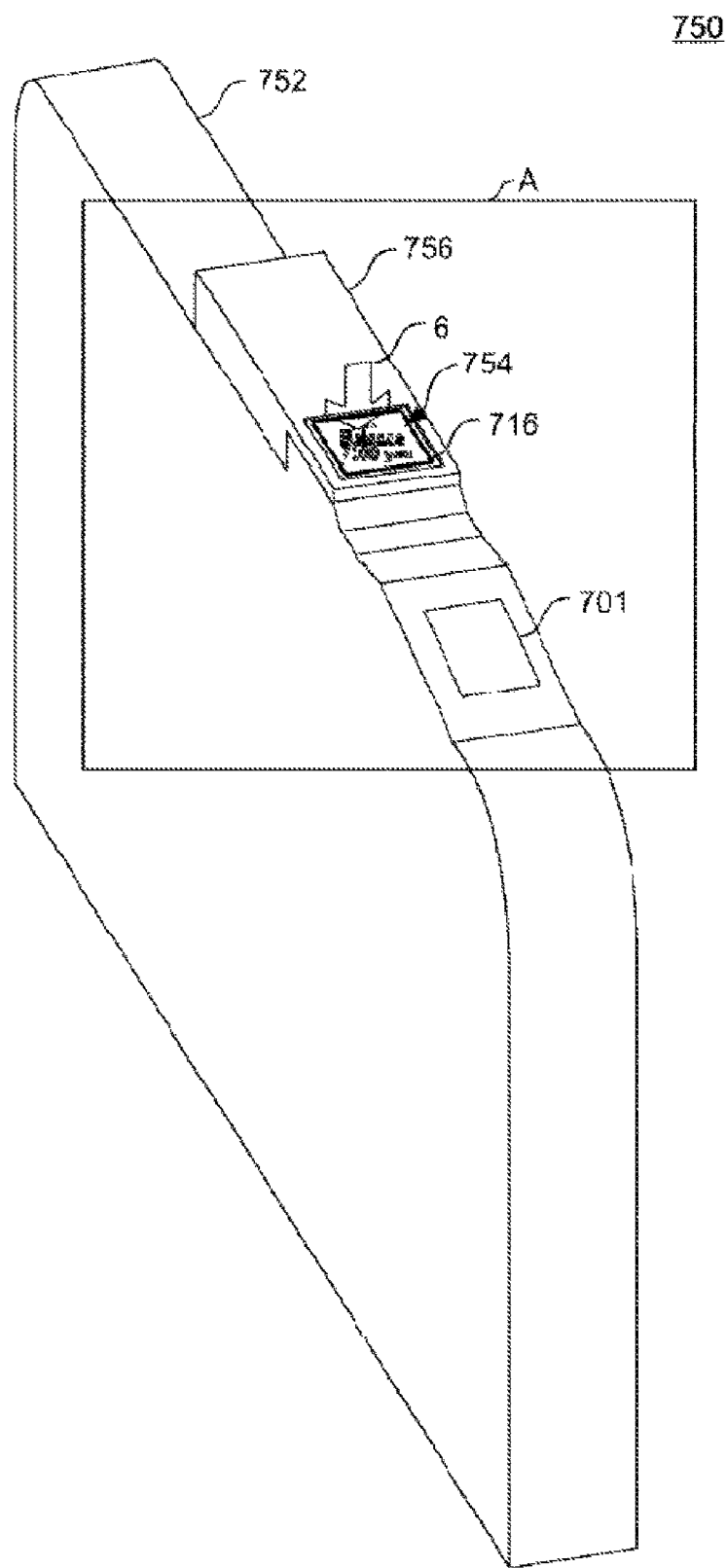
FIG. 7 schematically shows an application example in a case where the display apparatus 10 is utilized in a ticket gate.
Figure 8:
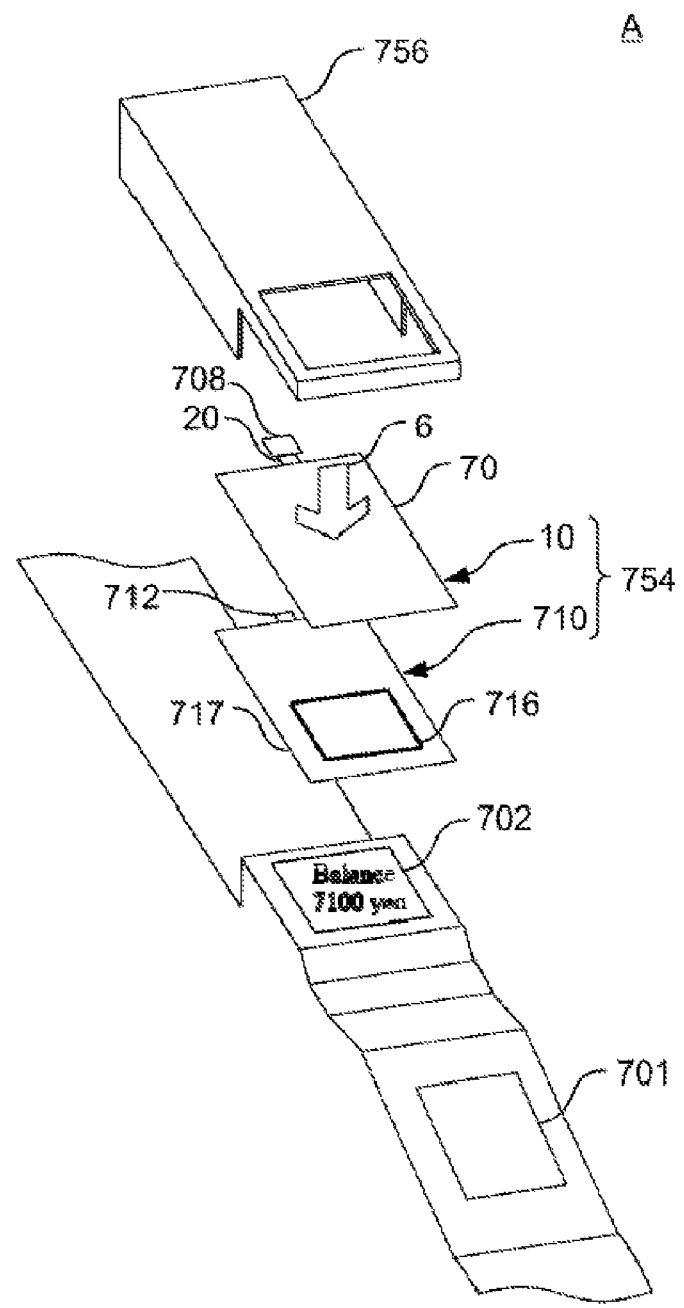
FIG. 8 is a schematic exploded perspective view of a ticket gate system 750.

FIG. 7 schematically shows a usage example in a case where the display apparatus 10 is utilized in a ticket gate. FIG. 7 is a schematic perspective view showing the entirety of a ticket gate system 750. FIG. 8 is a schematic exploded perspective view of the ticket gate system 750. The ticket gate system 750 is an example of an optical system including the display apparatus 10.

The ticket gate system 750 includes a ticket gate main body 752, a display system 754, and a fixing cover 756. The display system 754 has a control unit 708, the display apparatus 10, and a display apparatus 710.

The ticket gate main body 752 has a communication unit 701 and a display unit 702. The communication unit 701 and the display unit 702 are examples of a user interface unit, and provide the interface between a user and the ticket gate main body 752.

The communication unit 701 utilizes near-field communication to communicate with a non-contact communication device held by a user. The communication unit 701 communicates with the non-contact communication device through near-field communication. Examples of the non-contact communication device include an IC card such as an IC card ticket and a mobile phone having a non-contact communication function. The display unit 702 displays information to a user. For example, the display unit 702 displays the balance and the like of electronic money stored in the non-contact communication device.

The display apparatus 10 and the display apparatus 710 are placed on the display surface of the display unit 702. The fixing cover 756 accommodates part of the display apparatus 10 and the display apparatus 710, and fixes the display apparatus 10 and the display apparatus 710 to the ticket gate main body 752. The fixing cover 756 has an opening portion corresponding to the display unit 702. Light emitted from the display unit 702 and light emitted from the display apparatus 10 and the display apparatus 710 are emitted to the outside through the opening portion of the fixing cover 756.

The image 6 formed by the display apparatus 10 presents the position of the display unit 702 to the user. The user recognizes the image 6 that appears to be located in a space above the display unit 702.

The display apparatus 710 includes a light-guiding plate 717 and a light source portion 712. The light-guiding plate 717 corresponds to the light-guiding plate 70, and the light source portion 712 corresponds to the light source portion 20. The light-guiding plate 717 has a configuration that is similar to that of the light-guiding plate 70, except that light convergence portions that form an image that is different from the image 6 formed by the display apparatus 10 are included. The light-guiding plate 717 displays an image 716 that surrounds the display surface of the display unit 702. Note that similar to the image 6, the image 716 may be a stereoscopic image recognized at a position that is different from that of the emission surface of the light-guiding plate 717, or may also be a two-dimensional image recognized at a position above the emission surface of the light-guiding plate 717.

As shown in FIG. 7, according to the display apparatus 10, the image 6 recognized in the space above the position of the display unit 702 can be formed. Thus, even if the user is distant from the ticket gate main body 752, the user can easily determine whether the display unit 702 is provided in the vicinity of the communication unit 701 or provided at a distance. Also, the display apparatus 10 and the display apparatus 710 are overall transparent, and thus the display apparatus 10 and the display apparatus 710 can be placed on the display surface of the display unit 702.

Note that an image that is to show the user the position of the communication unit 701 may also be formed in the space located above the communication unit 701 by providing a display apparatus having a configuration similar to that of the display apparatus 10, on the communication unit 701.

Figure 9:
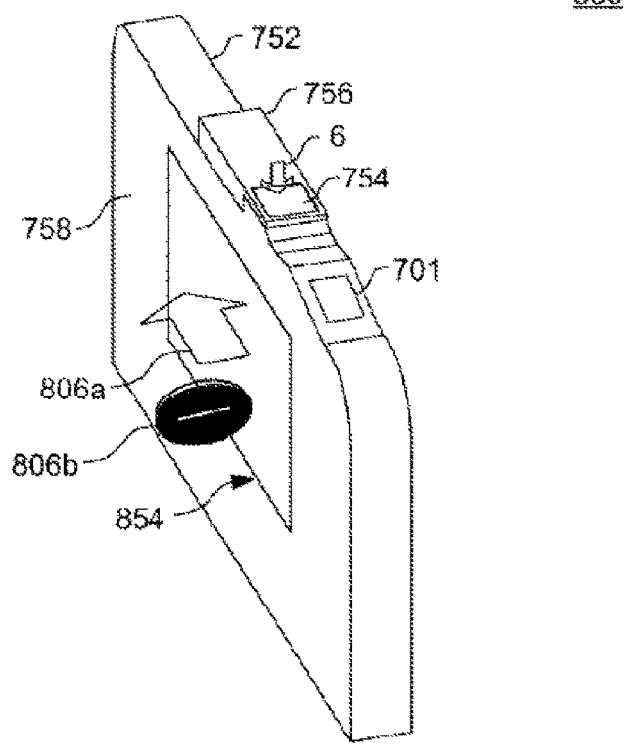
FIG. 9 schematically shows a ticket gate system 850 as a modification of the ticket gate system 750.
Figure 9:
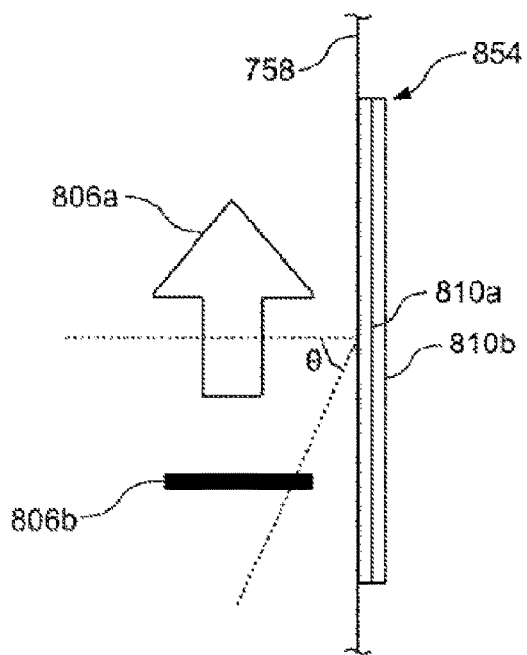

FIG. 9 schematically shows a ticket gate system 850 as a modification of the ticket gate system 750. FIG. 9(a) is a perspective view showing the entirety of ticket gate system 850. FIG. 9(b) is a plan view in the xz plane of the ticket gate system 850.

The ticket gate system 850 includes a display system 854 in addition to the constituent elements included in the ticket gate system 750. The display system 854 has a display apparatus 810a and a display apparatus 810b. The display apparatus 810a and the display apparatus 810b are modifications of the display apparatus 10. The display apparatus 810a and the display apparatus 810b have a configuration that is similar to that of the display apparatus 10, except that light convergence portions that form a stereoscopic image that is different from the image 6 are included.

The side portion of the ticket gate main body 752 is approximately perpendicular to a passage surface along which the user moves, and includes a side surface 758 that extends along a passage direction in which the user moves. The display apparatus 810a and the display apparatus 810b are provided on the side surface 758 of the ticket gate main body 752. The display apparatus 810a and the display apparatus 810b are provided such that their y axes approximately coincide with the vertical direction. The emission surface of the display apparatus 810*a* is approximately parallel to the side surface 758.

The display apparatus 810*a* forms an image 806*a*. The display apparatus 810*b* forms an image 806*b*. The image 806*a* is recognized at a position that is spaced apart from the emission surface of the display apparatus 810*a* and located above the passage surface. Similarly, the image 806*b* is recognized at a position that is spaced apart from the emission surface of the display apparatus 810*a* and located above the passage surface.

The image 806*a* indicates that the user is allowed to pass through the ticket gate. The image 806*a* is an arrow indicating the direction in which the user can move, for example, and indicates that the user is allowed to pass through the ticket gate in the direction indicated by this arrow. The image 806*b* indicates that the user is not allowed to pass through the ticket gate. The image 806*b* is a mark that shows prohibition of passage, for example. When the control unit 708 acquires a signal indicating that the user is allowed to pass through the ticket gate, the control unit 708 causes the display apparatus 810*a* to form the image 806*a*, and does not allow the display apparatus 810*b* to form the image 806*b*. On the other hand, when the control unit 708 acquires a signal indicating that the user is prohibited from passing through the ticket gate, the control unit 708 causes the display apparatus 810*b* to form the image 806*b*, and does not allow the display apparatus 810*a* to form the image 806*a*.

Note that in order to prevent the image 806*a* from being seen from a direction opposite to the direction in which the image 806*a* allows passage, the range of angles at which light is emitted from the light convergence portions of the display apparatus 810*a* is limited to a range of a predetermined angle θ from the center of the display apparatus 810*a* on the side opposite to the direction in which the passage is allowed. Similarly, in order to prevent the image 806*a* from being seen from a direction opposite to the direction in which the image 806*b* allows passage, the range of angles at which light is emitted from the light convergence portions of the display apparatus 810*b* is also limited to a range of the predetermined angle θ.

Figure 10:
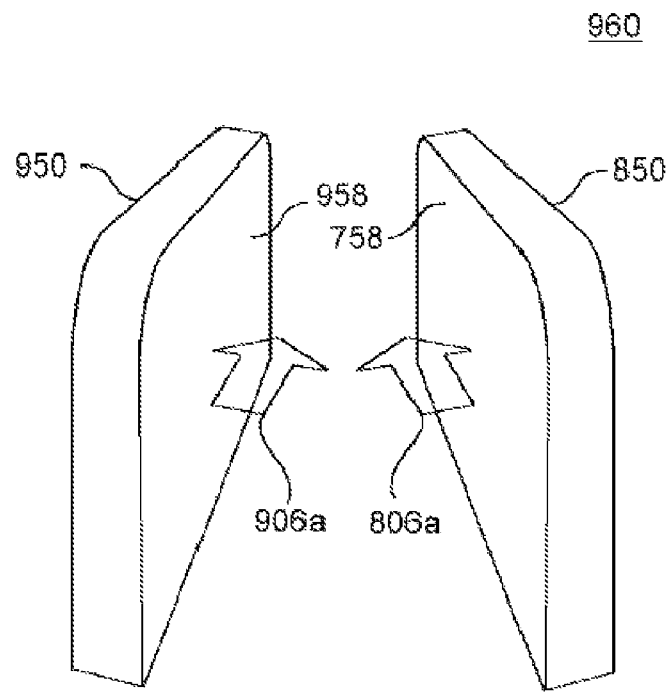
FIG. 10 schematically shows a ticket examination system 960 including a ticket gate system 850 and a ticket gate system 950.
Figure 10:
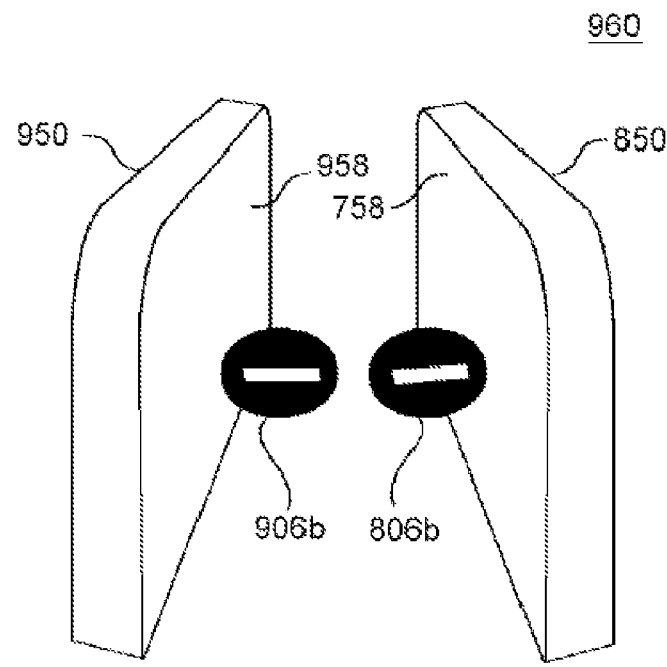

FIG. 10 schematically shows a ticket examination system 960 including a ticket gate system 850 and a ticket gate system 950. The ticket gate system 950 includes constituent elements that are approximately the same as those of the ticket gate system 850. A side surface 958 of the ticket gate system 950 has a display system that is similar to the display system 854, the side surface 958 corresponding to the side surface 758 of the ticket gate system 850, and the ticket gate system 950 forms an image 906*a* that is similar to the image 806*a*, and an image 906*b* that is similar to the image 806*b*.

FIG. 10(*a*) is a display example in the case where the user is allowed to pass through the ticket gate. FIG. 10(*b*) is a display example in the case where the user is prohibited from passing through the ticket gate. According to the ticket gate system 850 or the ticket examination system 960, it is possible to eliminate a movable portion for prohibiting passage. Also, the image 806*a* for allowing passage can be presented so as to be recognized above the passage surface, and thus it is possible to easily present to the user the direction in which the user can pass through the ticket gate.

Figure 11:
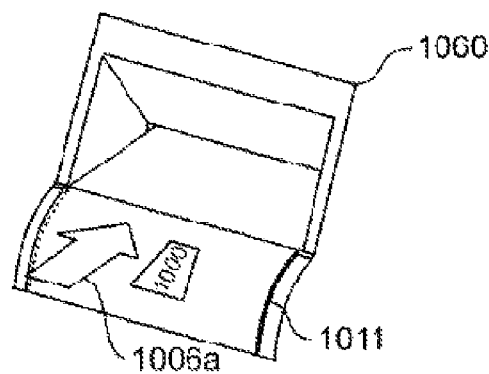
FIG. 11 schematically shows a bill reader of a ticket vending system 1050.
Figure 11:
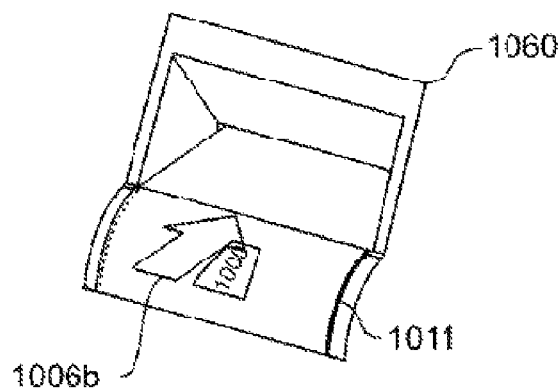
Figure 11:
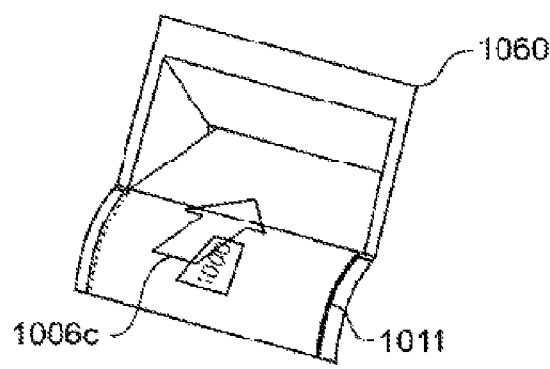

FIG. 11 schematically shows a bill-insertion portion of a ticket vending system 1050. FIGS. 11(*a*), 11(*b*), and 11(*c*) schematically show switching of stereoscopic images formed by the ticket vending system 1050. The ticket vending system 1050 includes a bill-insertion portion 1060 and a display unit 1011. The bill-insertion portion 1060 is one example of a user interface portion. The display unit 1011 is provided below the bill-insertion portion 1060.

The display unit 1011 can form an image 1006*a*, an image 1006*b*, and an image 1006*c* separately from each other, in the vicinity of a bill-insertion inlet of the bill-insertion portion 1060. The image 1006*a*, the image 1006*b*, and the image 1006*c* are stereoscopic images located above the display surface of the display unit 1011. The display unit 1011 forms the image 1006*a*, the image 1006*b*, and the image 1006*c* in a manner in which these images are temporally switched successively. For example, after the image 1006*a* is formed for a predetermined period of time, the display unit 1011 forms the image 1006*b* for a predetermined period of time, and then forms the image 1006*a* for a predetermined period of time. Thereafter, similarly, the display unit 1011 repeatedly forms the image 1006*a*, the image 1006*b*, and the image 1006*c* successively. In one display mode, the image 1006*a*, the image 1006*b*, and the image 1006*c* are not formed simultaneously. In another display mode, the image 1006*a*, the image 1006*b*, and the image 1006*c* may be formed simultaneously.

Figure 12:
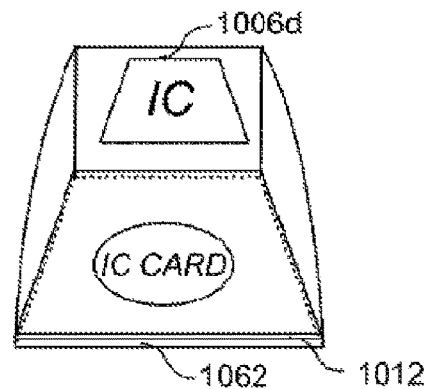
FIG. 12 schematically shows a card reader of the ticket vending system 1050.
Figure 12:
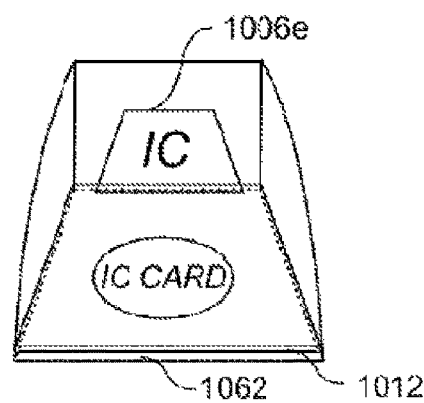
Figure 12:
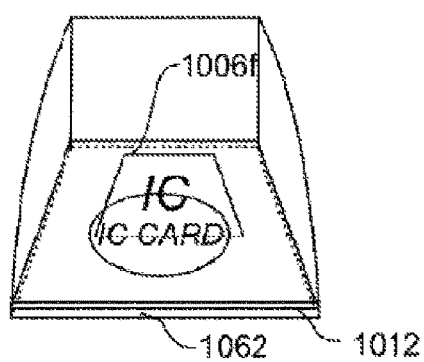

FIG. 12 schematically shows a card reader of the ticket vending system 1050. FIGS. 12(*a*), 12(*b*), and 12(*c*) schematically show another example of switching of stereoscopic images formed by the ticket vending system 1050. The ticket vending system 1050 includes a card reader 1062 and a display unit 1012. The card reader 1062 is one example of the user interface portion. The display unit 1012 is provided on the card reader 1062.

The display unit 1012 can form an image 1006*d*, an image 1006*e*, and an image 1006*f* separately from each other, above the card reader 1062. The image 1006*d*, the image 1006*e*, and the image 1006*f* are stereoscopic images located above the display surface of the display unit 1012. The display unit 1012 forms the image 1006*d*, the image 1006*e*, and the image 1006*f* in a manner in which these images are temporally switched successively. For example, after the display unit 1012 forms the image 1006*d* for a predetermined period of time, the display unit 1012 forms the image 1006*e* for a predetermined period of time, and then forms the image 1006*f* for a predetermined period of time. Thereafter, similarly, the display unit 1012 repeatedly forms the image 1006*d*, the image 1006*e*, and the image 1006*f* successively. In one display mode, the image 1006*d*, the image 1006*e*, and the image 1006*f* are not formed simultaneously. In another display mode, the image 1006*d*, the image 1006*e*, and the image 1006*f* may be formed simultaneously.

Figure 13:
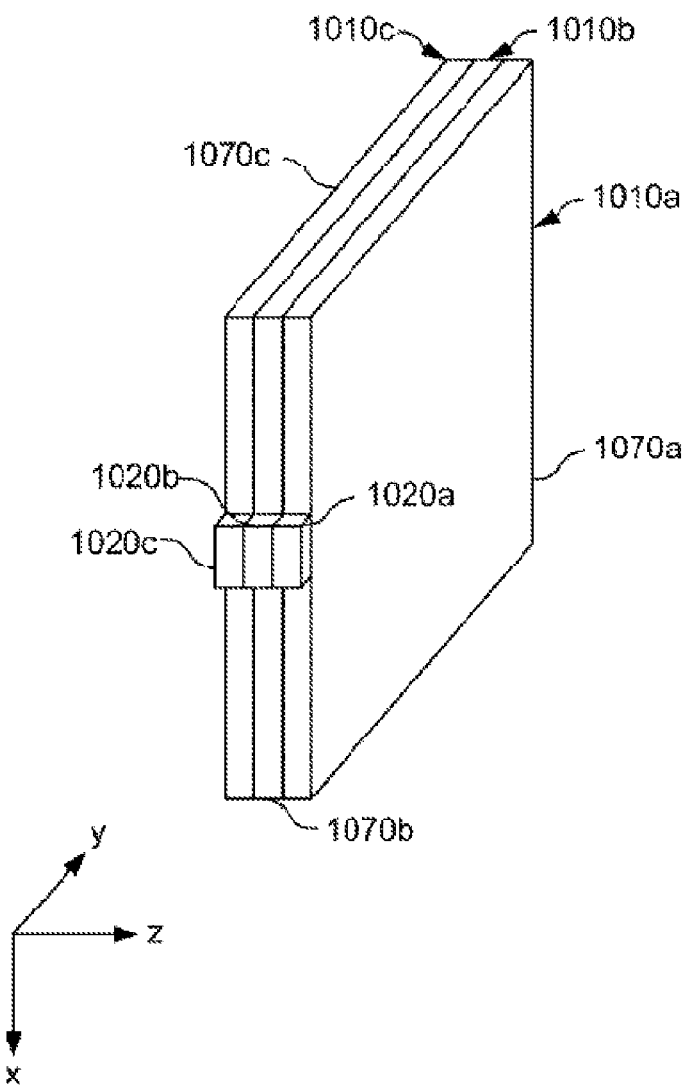
FIG. 13 schematically shows a configuration of a display unit 1011.

FIG. 13 schematically shows the configuration of the display unit 1011. The display unit 1011 has a display apparatus 1010*a*, a display apparatus 1010*b*, and a display apparatus 1010*c*. The display apparatus 1010*a* has a light source portion 1020*a* and a light-guiding plate 1070*a*. The display apparatus 1010*b* has a light source portion 1020*b* and a light-guiding plate 1070*b*. The display apparatus 1010*c* has a light source portion 1020*c* and a light-guiding plate 1070*c*.

The light source portion 1020*a*, the light source portion 1020*b*, and the light source portion 1020*c* have a configuration that is approximately the same as that of the light source portion 20. The light-guiding plate 1070*a*, the light-guiding plate 1070*b*, and the light-guiding plate 1070*c* are made of a flexible material. Also, the light-guiding plate 1070*a*, the light-guiding plate 1070*b*, and the light-guiding plate 1070*c* each have light convergence portions that form an image that is different from the image 6. The light-guiding plate 1070*a*, the light-guiding plate 1070*b*, and the light-guiding plate 1070*c* have a configuration that is approximately similar to that of the light-guiding plate 70, except for these respects. The display unit 1011 is provided with a display apparatus 1010a, a display apparatus 1010b, and a display apparatus 1010c that are overlaid on each other in the stated order along the z-axis positive direction.

The light-guiding plate 1070a has light convergence portions for forming an image 1006a. The light-guiding plate 1070b has light convergence portions for forming an image 1006b. The light-guiding plate 1070c has light convergence portions for forming an image 1006c. Thus, among the light source portion 20a, the light source portion 20b, and the light source portion 20c, the light source portion that actually causes light to be emitted is switched between the light source portion 20a, the light source portion 20b, and the light source portion 20c in the stated order, and thereby, it is possible to successively form the image 1006a, the image 1006b, and the image 1006c in a manner in which the images are switched temporarily.

Figure 14:
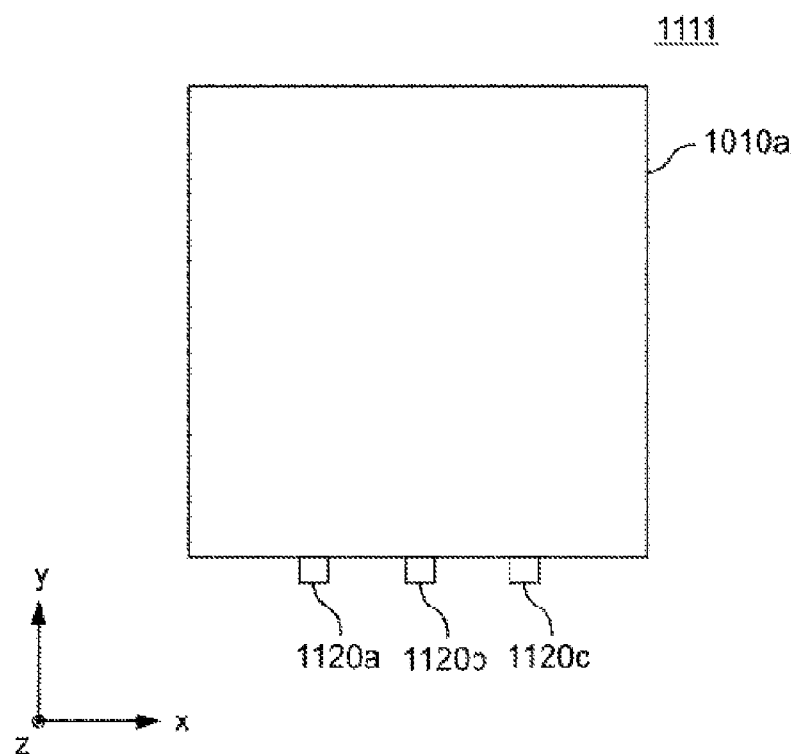
FIG. 14 schematically shows a display unit 1111 as a modification of the display unit 1011.
Figure 14:
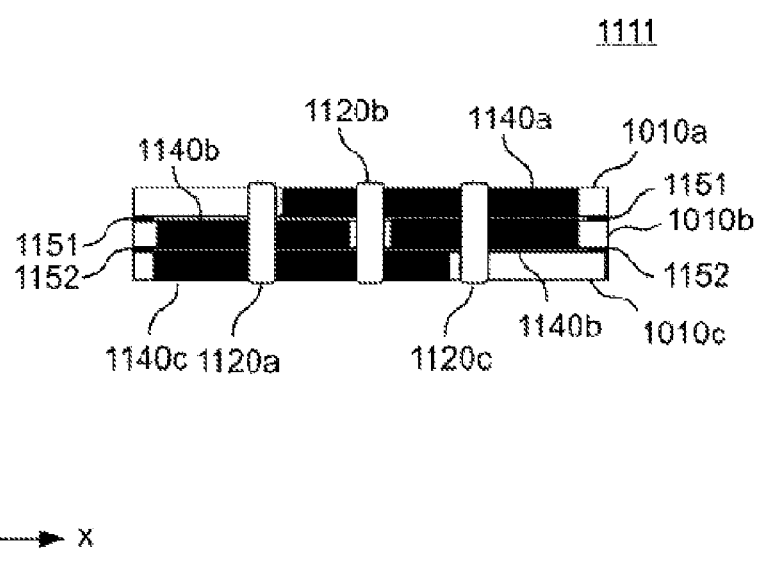

FIG. 14 schematically shows a display unit 1111 as a modification of the display unit 1011. FIG. 14(a) is a plan view in the xy plane in a case where the display unit 1111 is viewed from a position in the z-axis positive direction. FIG. 14(b) is a plan view in the xz plane in a case where the display unit 1111 is viewed from a position in the y-axis negative direction. The display unit 1111 has a light source portion 1120a instead of the light source portion 1020a of the display unit 1011, has a light source portion 1120b instead of the light source portion 1020b, and has a light source portion 1120c instead of the light source portion 1020c. The display unit 1111 further includes a light-blocking portion 1140a, a light-blocking portion 1140b, and a light-blocking portion 1140c, and a spacer 1151 and a spacer 1152 in addition to the other constituent elements included in the display unit 1011. FIG. 14(b) is a plan view along the xy plane in a case where the display unit 1111 is viewed from a position in the z-axis positive direction.

The light source portion 1120a is provided across a light-entering end surface of the light-guiding plate 1070a, a light-entering end surface of the light-guiding plate 1070b, and a light-entering end surface of the light-guiding plate 1070c. Similarly, the light source portion 1120b is provided across the light-entering end surface of the light-guiding plate 1070a, the light-entering end surface of the light-guiding plate 1070b, and the light-entering end surface of the light-guiding plate 1070c. Also, the light source portion 1120c is provided across the light-entering end surface of the light-guiding plate 1070a, the light-entering end surface of the light-guiding plate 1070b, and the light-entering end surface of the light-guiding plate 1070c.

The light-blocking portion 1140a, the light-blocking portion 1140b, and the light-blocking portion 1140c block light. The light-blocking portion 1140a, the light-blocking portion 1140b, and the light-blocking portion 1140c are light-blocking tape or a light-blocking film, for example. The light-blocking portion 1140a is provided in a portion of the light-entering end surface of the light-guiding plate 1070a. The light-blocking portion 1140a prevents light emitted from the light source portion 1120b and light emitted from the light source portion 1120c from entering the display apparatus 1010a. Also, the light-blocking portion 1140b is provided in a portion of the light-entering end surface of the light-guiding plate 1070b, and prevents light emitted from the light source portion 1120a and light emitted from the light source portion 1120c from entering the display apparatus 1010b. The light-blocking portion 1140c is provided in a portion of the light-entering end surface of the light-guiding plate 1070c, and prevents light emitted from the light source portion 1120a and light emitted from the light source portion 1120b from entering the display apparatus 1010c.

Specifically, as shown in FIGS. 14(a) and 14(b), the light-blocking portion 1140b is provided at least between the light-entering end surface of the light-guiding plate 1070b and the light source portion 1120a, and between the light-entering end surface of the light-guiding plate 1070b and the light source portion 1120c. The light-blocking portion 1140b is not provided at a position at which the light source portion 1120b is provided, on the light-entering end surface of the light-guiding plate 1070b. Accordingly, it is possible to cause light emitted from the light source portion 1120b to enter the light-entering end surface of the light-guiding plate 1070b, and to substantially not allow light emitted from the light source portion 1120a and light emitted from the light source portion 1120c to enter the light-entering end surface of the light-guiding plate 1070b.

Similarly, the light-blocking portion 1140a is provided at least between the light-entering end surface of the light-guiding plate 1070a and the light source portion 1120b, and between the light-entering end surface of the light-guiding plate 1070a and the light source portion 1120c. The light-blocking portion 1140a is not provided at a position at which the light source portion 1120a is provided, on the light-entering end surface of the light-guiding plate 1070a. Accordingly, it is possible to cause light emitted from the light source portion 1120a to enter the light-entering end surface of the light-guiding plate 1070a, and to substantially not allow light emitted from the light source portion 1120b and light emitted from the light source portion 1120c to enter the light-entering end surface of the light-guiding plate 1070a.

Also, the light-blocking portion 1140c is provided at least between the light-entering end surface of the light-guiding plate 1070c and the light source portion 1120a, and between the light-entering end surface of the light-guiding plate 1070c and the light source portion 1120b. The light-blocking portion 1140c is not provided at a position at which the light source portion 1120c is provided, on the light-entering end surface of the light-guiding plate 1070c. Accordingly, it is possible to cause light emitted from the light source portion 1120c to enter the light-entering end surface of the light-guiding plate 1070c, and to substantially not allow light emitted from the light source portion 1120a and light emitted from the light source portion 1120b to enter the light-entering end surface of the light-guiding plate 1070c.

Also, the spacer 1151 is provided between the display apparatus 1010a and the display apparatus 1010b. The spacer 1152 is provided between the display apparatus 1010b and the display apparatus 1010c. The spacer 1151 can prevent close contact between the display apparatus 1010a and the display apparatus 1010b. Also, the spacer 1152 can prevent close contact between the display apparatus 1010b and the display apparatus 1010c.

Note that a configuration similar to the display unit 1011 or the display unit 1111 described with reference to FIGS. 13 and 14 can be applied to the display unit 1012.

Figure 15:
FIG. 15 schematically shows a modification of the light convergence portion 30.
Figure 15:
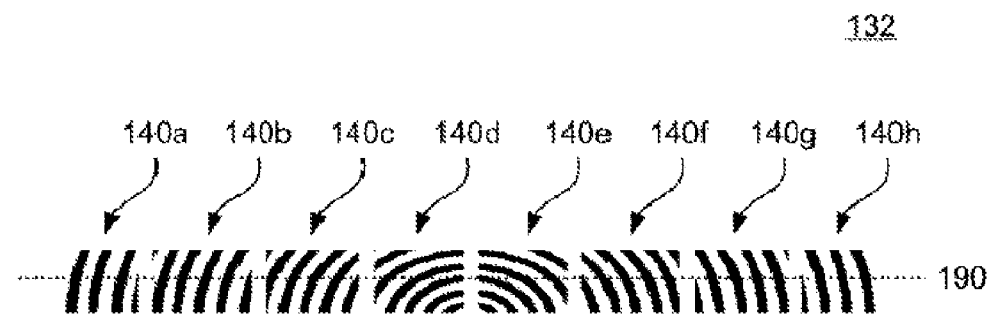

FIG. 15 schematically shows a light convergence portion 130 and a light convergence portion 132 as modifications of the light convergence portion 30. FIG. 14(a) schematically shows one light convergence portion 130 formed by a portion of a Fresnel lens. Note that a gap may also be provided between a plurality of refracting interfaces (prism planes) of the light convergence portion 130 that functions as the Fresnel lens.

The light convergence portion 132 shown in FIG. 14(b) corresponds to a plurality of portions 140a, 140b, 140c, 140d, 140e, 140f, 140g, and 140h that are obtained by dividing the light convergence portion 130 along the x-axis direction. Light emitted from the portions 140 of the light convergence portion 132 converges at the same fixed point. In this manner, by dividing the light convergence portion into the plurality of portions, a so-called black matrix effect occurs and the contrast of an image increases in some cases. Note that in addition to the reflection surface or the Fresnel lens, a diffraction grating may also be used as the light convergence portion 30.

Although the present invention was described by way of an embodiment, the technical scope of the present invention is not limited to the above-described embodiment. It is clear for a person skilled in the art that various changes or modifications can be added to the above-described embodiment. It is clear from the claims that embodiments to which such changes or modifications are added are also included in the technical scope of the present invention.

Note that the order of executing processes such as operations, procedures, steps, and stages in the apparatus, system, program, and method shown in the claims, specification, and drawings is not clearly stated, such as in particular, "before", "prior to", or the like, and the processes may be realized in any order unless the output of the former process is used in the later process. Even though operation flows in the claims, specification, and drawings are described using "first", "next", or the like for convenience, it does not mean that performing the operation flow in the stated order is essential.

INDEX TO THE REFERENCE NUMERALS

6 Image
10 Display apparatus
20 Light source portion
21 First light source
22 Second light source
23 Third light source
30 Light convergence portion
32 Reflection surface
70 Light-guiding plate
71 Emission surface
72 Back surface
73, 74, 75, 76 End surface
130, 132 Light convergence portion
140 Portion
190 Line
290 Fixed point
300 Lens
310 Display apparatus
401, 402, 403 Partial surface
410 Display apparatus
470 Light-guiding plate
473 End surface
701 Communication unit
702 Display unit
708 Control unit
710 Display apparatus
712 Light source portion
716 Image
717 Light-guiding plate
750 Ticket gate system
752 Ticket gate main body
754 Display system
756 Fixing cover
758 Side surface
806 Image
810 Display apparatus
850 Ticket gate system
854 Display system
950 Ticket gate system
960 Ticket examination system
1006 Image
1010 Display apparatus
1011 Display unit
1020 Light source portion
1050 Ticket vending system
1060 Bill-insertion portion
1070 Light-guiding plate
1111 Display unit
1120 Light source portion
1140 Light-blocking portion
1151, 1152 Spacer

The invention claimed is:

1. An optical device comprising:
one or more light sources; and
a light-guiding plate that guides light emitted from the light sources in a plane parallel to an emission surface that emits light, the light-guiding plate comprising a plurality of light convergence portions that receive light guided by the light-guiding plate, each of the plurality of light convergence portions corresponding to one of a plurality of convergence points in a space outside the light-guiding plate and comprising optical surfaces that cause light to be emitted from the emission surface such that: the light substantially converges at the corresponding one of the plurality of convergence points in the space; or the light substantially scatters from the corresponding one of the plurality of convergence points in the space, wherein:
ones of the plurality of convergence points corresponding to the plurality of light convergence portions are different from each other, and an image is formed in the space by a collection of ones of the plurality of convergence points; and
a plurality of first light convergence portions from among the plurality of light convergence portions are provided at positions that are different from each other along a light-guiding direction in which the light-guiding plate guides light, and cause light to be emitted from the emission surface in different directions in which the light: substantially converges at a first convergence point among the plurality of convergence points; or substantially scatters from the first convergence point.

2. The optical device according to claim 1, wherein a plurality of second light convergence portions from among the plurality of light convergence portions are provided at positions that are different from each other along the light-guiding direction in which the light-guiding plate guides light, and cause light to be emitted from the emission surface in different directions in which the light: substantially converges at a second convergence point that is different from the first convergence point among the plurality of convergence points; or substantially scatters from the second convergence point.

3. The optical device according to claim 1,
wherein an area of the optical surfaces of the plurality of first light convergence portions is determined such that light beams that are respectively emitted from the plurality of first light convergence portions have approximately the same luminous intensity.

4. The optical device according to claim 1,
wherein the optical surfaces of the plurality of first light convergence portions are reflection surfaces that reflect light that is received by the first light convergence portions, and
in order to cause light to be emitted from the emission surface in different directions in which the light substantially converges at the first convergence point or substantially scatters from the first convergence point, angles of the reflection surfaces of the plurality of first light convergence portions are determined based on a positional relationship between positions of the plurality of first light convergence portions in a plane extending along the emission surface and the first convergence point.

5. The optical device according to claim 1,
wherein a plurality of the light sources are provided, and
angles that optical axes of the plurality of the light sources form with the plane parallel to the emission surface are different from each other.

6. The optical device according to claim 5,
wherein a light-entering end surface of the light-guiding plate comprises a plurality of partial surfaces that receive light from a corresponding light source among the plurality of the light sources, and
the plurality of partial surfaces are each approximately orthogonal to an optical axis of the corresponding light source among the plurality of the light sources.

7. The optical device according to claim 1, further comprising:
a lens portion that is provided between the light sources and a light-entering end surface of the light-guiding plate, wherein the lens portion reduces a spread of the light emitted from the light sources, and emits the light to the light-entering end surface of the light-guiding plate.

8. The optical device according to claim 1,
wherein the plurality of light convergence portions are formed along respective lines that are determined in advance in the plane parallel to the emission surface.

9. An optical system comprising:
the optical device according to claim 1; and
a user interface unit,
wherein the optical device forms the image that shows a user a position of the user interface unit.

10. A ticket gate comprising:
the optical system according to claim 9.

11. An optical device comprising:
a plurality of light sources; and
a light-guiding plate that guides light emitted from the plurality of light sources in a plane parallel to an emission surface that emits light, the light guiding plate comprising a plurality of convergence portions that receive light guided by the light-guiding plate, each of the plurality of light convergence portions corresponding to one of a plurality of convergence points in a space outside the light-guiding plate and comprising optical surfaces that cause light to be emitted from the emission surface such that: the light substantially converges at the corresponding convergence point in the space; or the light substantially scatters from the corresponding convergence point in the space, wherein:
angles that optical axes of the plurality of light sources form with the plane parallel to the emission surface are different from each other;
the convergence points for the plurality of light convergence portions are different from each other, and an image is formed in the space on an emission surface side by a collection of a plurality of the convergence points; and
a plurality of first light convergence portions from among the plurality of light convergence portions is provided at positions that are different from each other along a light-guiding direction in which the light-guiding plate guides light, and causes light to be emitted from the emission surface in different directions in which the light: substantially converges at a first convergence point among the plurality of convergence points; or substantially scatters from the first convergence point.

* * * * *